United States Patent
Liu et al.

(10) Patent No.: US 12,383,972 B2
(45) Date of Patent: Aug. 12, 2025

(54) SYSTEMS AND METHODS TO CONTROL A WIRE ELECTRODE AT THE END OF A WELD

(71) Applicant: Illinois Tool Works Inc., Glenview, IL (US)

(72) Inventors: Shuang Liu, Appleton, WI (US); James Lee Uecker, Appleton, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 846 days.

(21) Appl. No.: 17/468,087

(22) Filed: Sep. 7, 2021

(65) Prior Publication Data

US 2022/0097161 A1    Mar. 31, 2022

Related U.S. Application Data

(60) Provisional application No. 63/085,726, filed on Sep. 30, 2020.

(51) Int. Cl.
| B23K 9/12 | (2006.01) |
| B23K 9/095 | (2006.01) |
| B23K 9/133 | (2006.01) |

(52) U.S. Cl.
CPC ............ B23K 9/125 (2013.01); B23K 9/0953 (2013.01); B23K 9/0956 (2013.01); B23K 9/1336 (2013.01)

(58) Field of Classification Search
CPC .... B23K 9/0953; B23K 9/0956; B23K 9/125; B23K 9/1336

USPC .................................................. 219/137.71
See application file for complete search history.

(56) References Cited

U.S. PATENT DOCUMENTS

| 2011/0220629 A1* | 9/2011 | Mehn | B65H 51/30 |
| | | | 219/136 |
| 2013/0146575 A1* | 6/2013 | Hillen | B23K 9/1336 |
| | | | 219/137.71 |
| 2017/0021440 A1* | 1/2017 | Balaster | B23K 9/173 |
| 2020/0101551 A1* | 4/2020 | Murakami | B23K 9/126 |
| 2020/0130094 A1* | 4/2020 | Davidson | B23K 9/0956 |
| 2020/0368904 A1* | 11/2020 | Aldridge | B23K 9/0953 |

FOREIGN PATENT DOCUMENTS

| DE | 4204661 | 6/1993 |
| WO | 2011148042 | 12/2011 |

OTHER PUBLICATIONS

Canadian Office Action Appln No. 3,130,599 dated Jan. 5, 2024.

* cited by examiner

*Primary Examiner* — Chris Q Liu
*Assistant Examiner* — James F Sims, III
(74) *Attorney, Agent, or Firm* — McAndrews, Held & Malloy, Ltd.

(57) ABSTRACT

Systems and methods are described to address issues associated with welding with cored wires. In certain processes, a welding wire may "stick" or fuse to a contact tip, such as at termination of a weld. To mitigate the negative effects of a wire fusing to a contact tip, the wire remains in motion at a time prior to the end of the weld, as the weld ends, and/or for a time after the end of the weld, to limit and/or eliminate fusion between the wire and the contact tip.

18 Claims, 5 Drawing Sheets

SYSTEMS AND METHODS TO CONTROL A WIRE ELECTRODE AT THE END OF A WELD

CROSS-REFERENCE TO RELATED APPLICATIONS

This application hereby claims priority to and the benefit of U.S. Provisional Application Ser. No. 63/085,726 entitled "Systems And Methods To Control A Wire Electrode At The End Of A Weld," filed Sep. 30, 2020. The above listed U.S. Application is hereby incorporated by reference in its entirety for all purposes.

BACKGROUND

One of the first steps of a welding process is establishing an electrical arc between a welding torch and a workpiece. Some arc welding systems use wire electrodes fed to the welding torch to establish the electrical arc. Establishing the electrical arc with the wire electrode is easier if the wire electrode is free of welding residue adhered or unwanted contact at initiation of the weld. For example, at the end of some welding processes, the wire electrode may "stick" or fuse to a contact tip, creating issues at initiation of the next weld.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for mitigating the negative effects of a wire fusing to a contact tip at an end of a weld, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
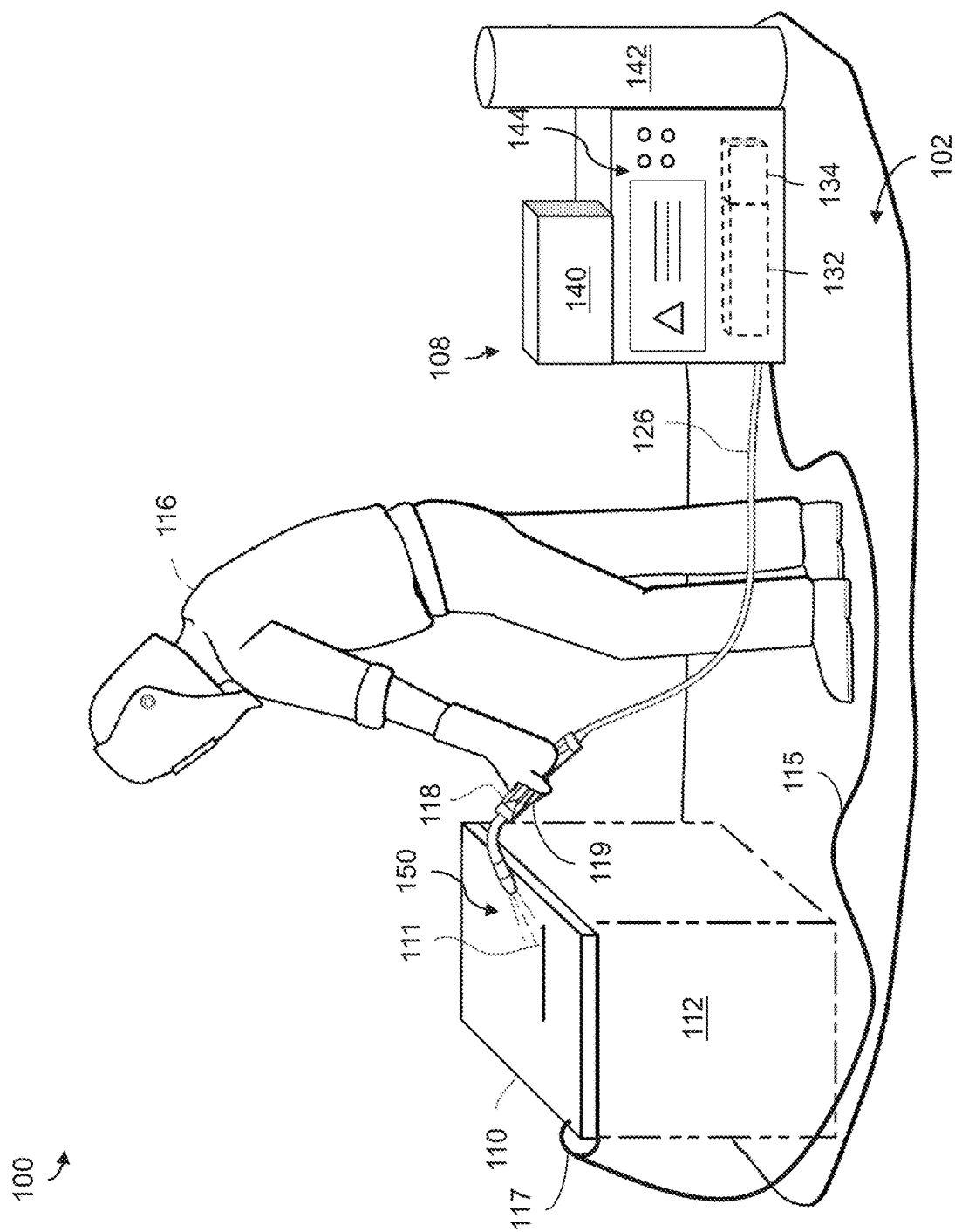
FIG. 1 is a perspective view of an operator using an example welding system, in accordance with aspects of this disclosure.

Systems and methods for mitigating the negative effects of a wire fusing to a contact tip at an end of a weld are disclosed. In particular, the disclosed systems and methods address issues associated with welding with cored wires, although the principles may be applicable for a variety of wire types or welding processes where wire "sticking" issues exist (e.g., wire materials with a low melting point and high surface resistance; copper coated solid wires; aluminum wires, stainless steel; etc.). For example, in certain processes, a welding wire may "stick" or fuse to a contact tip, such as at termination of a weld. To mitigate the negative effects of a wire fusing to a contact tip, the wire remains in motion at a time prior to the end of the weld, as the weld ends, and/or for a time after the end of the weld, to limit and/or eliminate fusion between the wire and the contact tip.

In some examples, upon determination of the end of a weld (or that the end of the weld is imminent), a wire feeder retracts the wire away from the weld (e.g., by a predetermined time and/or a predetermined distance). In some examples, even as the system has determined an end of the weld (or an end is imminent), current may continue to flow through the wire (e.g., to burn the wire, clear a weld puddle, etc.), even as the wire is retracted. Movement of the wire at this point in the welding process reduces the amount of time any part of the wire (e.g., a heated tip of the wire) is in contact with the contact tip, thereby reducing the chance for fusion. Once the wire has retracted for a given time period or for a given distance, the wire feeder advances the wire in preparation for another weld, thereby reducing the amount of lull time between welds while still limiting the occurrence of a fusion event.

Cored wire, also referred to as metal-cored wire, employs an external sheath to encase powdered metals. The sheath makes electrical contact with a contact tip of a welding torch, through which a substantial amount of current flows from the contact tip to a workpiece to form a weld. For instance, welding currents can range from below 350 to over 550 Amps. Although the contact tip has a relatively large surface area, the point of contact with the wire is relatively small (e.g., with an area of 0.2 $mm^2$ or less). The transfer of high current and energy tends to generate a hot spot on the wire. For example, the hot spot can, and often does, freeze and/or solidify (e.g., fuse), creating a spot weld inside the contact tip and causing the wire to temporarily stop feeding.

The wire may eventually break free from the contact tip (e.g., in response to a force from a wire feeder to drive the wire). For instance, the feeder may be continuously feeding the wire until the push force is able to break the fusion point between the wire and the contact tip. However, by the time the spot weld breaks freeing up the wire, a large spring force has been built-up in the wire, which may cause the wire to rapidly advance from the contact tip at a wire feed rate several times greater than a commanded wire feed rate. As a result, the wire is thrust into the weld puddle causing a hard short. Further, in order to clear the hard short created at the weld puddle, additional current must be added, creating another hot spot, which further exacerbates the situation.

In some examples, the end of a weld typically involves some slowdown of the wire feed speed prior to application of an increased current. For example, a greater current is used to "burn" the wire, which provides some distance between the end of the weld wire and the weld puddle. This is done to prevent the wire from solidifying in the weld puddle at the end of the weld. Unfortunately, burn back can result, causing a hot spot on the wire that, when stopping the wire, increases the possibility for the hot spot to fuse (or freeze) to the contact tip. When the system initiates another weld, the fused portion of the wire creates a violent and unpredictable weld start, which may include wire stubbing, "flaming baton", burn back, or a bead hump. To address the issue of a sticking wire, other attempts focused on reducing energy at the time of the weld stop. However, energy at too low of a level results in a ball of metal being left on the end of the wire or the wire freezing in the puddle.

Disclosed systems and methods address these problems by moving the wire at the end of a weld to ensure any hot spot does not fuse within the contact tip. In some examples, the wire is retracted during the stopping point of the weld, and then the wire is advanced forward to ensure the wire is in a position to immediately perform the next weld. For instance, retracting the wire creates distance between the end of the wire and the workpiece. The wire advances in preparation for the next weld start to ensure there is no delay. This is particularly applicable for cyclical weld programs and/or welding of multiple welds in rapid succession, such as industrial welding by robotic welders (e.g., automotive applications employing stitch welding).

In disclosed examples, a welding system includes a wire feeder to advance and/or retract a welding wire; a welding power supply to provide power to a welding torch for establishing an electrical arc between the welding wire and a workpiece to perform a weld; and control circuitry configured to: determine an end of the weld and prior to initiation of another weld; control the wire feeder to retract the welding wire for a first time or for a first distance in response to a determination the weld has ended; and control the wire feeder to advance the welding wire for a second time or for a second distance.

In some examples, the end of the weld corresponds to one of completion of the weld or a determination that the end of the weld is imminent. In some examples, determination of the end of the weld is based at least in part on data from a predetermined welding program or an input from a sensor. In some examples, the welding program is defined by a welding process to perform a plurality of welds in succession.

In examples, one or more of a length or a duration of the weld is predetermined in accordance with the welding program, the control circuitry further configured to determine the end of a weld based on the predetermined length or the predetermined duration. In examples, the welding program comprises a cyclic pattern of a plurality of similar or different welds. In examples, the sensor input corresponds to a current or a voltage of the power to the welding torch falling within a threshold range of values, or a change in the current or voltage falling within a threshold range of values.

In some examples, the control circuitry is further configured to control the welding power supply to provide power to the welding torch to initiate another weld after the second time or the second distance has been achieved.

In some examples, upon determining that the end of the weld is imminent, the control circuitry is further configured to control the power supply to provide current to the welding torch as the welding wire retracts. In some examples, upon determining that the end of the weld is imminent, the control circuitry is further configured to control the power supply to end provision of power to the welding torch.

In disclosed examples, a wire feed system includes a drive mechanism configured to advance and/or retract a welding wire for establishing an electrical arc between the welding wire and a workpiece to perform a weld; and control circuitry configured to: receive a signal corresponding to an end of the weld; control the drive mechanism to retract the welding wire for a first time or for a first distance; and control the drive mechanism to advance the welding wire for a second time or for a second distance prior to initiation of another weld.

In some examples, the first time is equivalent to the second time or the first distance is equivalent to the second distance. In some examples, the first time is greater than the second time or the first distance is greater than the second distance.

In some examples, determination of the end of the weld is based at least in part on data from a predetermined welding program or an input from a sensor, the sensor input corresponding to a change in current powering a motor of the drive mechanism.

In some examples, the welding wire is a cored wire. In examples, the cored wire comprises a metallic sheath enclosing a powdered metal. In examples, the welding wire comprises a metallic solid wire.

In some examples, the control circuitry is further configured to initiate another weld after the second time. In examples, the wire feed system comprises a wire feeder configured to feed a welding wire to a welding torch. In examples, the wire feed system comprises a motorized torch with the drive mechanism incorporated within the torch.

In some examples, upon determining that the end of the weld is imminent, the control circuitry is further configured to control the power supply to reduce power to a wire feeder motor for a predetermine time prior to controlling the wire feeder to retract the welding wire.

Several examples are provided with respect to welding power supplies and various accessories. However, the concepts and principles disclosed herein are equally applicable to various power and control systems, including but not limited to engine-driven power systems driving one or more of a generator, an air compressor, and/or a hybrid welding power supply.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding power" or "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld, which may include a weld schedule, operational settings, or others. A welding program may further include other software, algorithms, processes, or other logic to control one or more welding-type devices to perform a weld.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 130.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

As used herein, a welding power supply, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Figure 2:
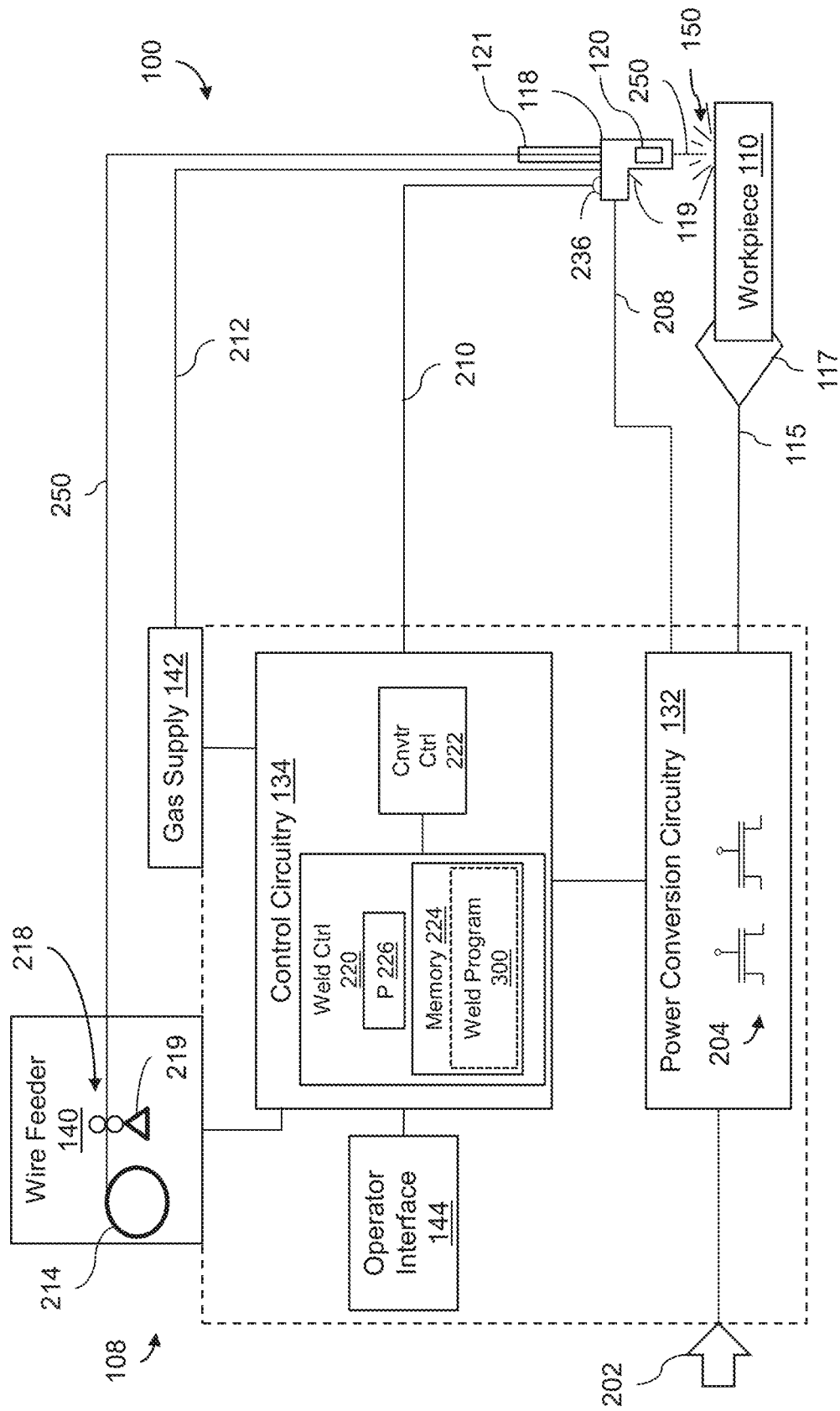
FIG. 2 is a block diagram illustrating components of the example welding system of FIG. 1, in accordance with aspects of this disclosure.

Turning now to the figures, FIGS. 1 and 2 show an example perspective and block diagram view, respectively, of a welding system 100. In the example of FIG. 1, the welding system 100 includes a welding torch 118 and work clamp 117 coupled to a welding power supply 108 within a welding cell 102. In the example of FIG. 1, the welding torch 118 is coupled to the welding power supply 108 via a welding cable 126, while the clamp 117 is coupled to the welding power supply 108 via a clamp cable 115. In the example of FIG. 1, an operator 116 is handling the welding torch 118 near a welding bench 112 that supports a workpiece 110 coupled to the work clamp 117. While only one workpiece 110 is shown in the examples of FIGS. 1 and 2, in some examples there may be several workpieces 110. While a human operator 116 is shown in FIG. 1, in some examples, the operator 116 may be a robot and/or automated welding machine.

In the example of FIG. 1, the welding torch 118 is a welding gun configured for gas metal arc welding (GMAW). In some examples, the welding torch 118 may comprise a gun configured for flux-cored arc welding (FCAW). In the examples of FIGS. 1 and 2, the welding torch 118 includes a trigger 119. In some examples, the trigger 119 may be activated by the operator 116 to trigger a welding operation (e.g., an arc welding process). In some examples, such as a robotic and/or automated welding process, a welding schedule or welding process may be accessed from a memory (e.g., memory 224 of FIG. 2) to automatically initiate one or more welds.

In the example of FIGS. 1 and 2, the welding power supply 108 includes (and/or is coupled to) a wire feeder 140. In the example of FIG. 2, the wire feeder 140 houses a wire spool 214 that is used to provide the welding torch 118 with a wire electrode 250 (e.g., solid wire, cored wire, coated wire, etc.). In the example of FIG. 2, the wire feeder 140 further includes rollers 218 configured to feed the wire electrode 250 to the torch 118 (e.g., from the spool 214) and/or retract the wire electrode 250 from the torch 118 (e.g., back to the spool 214). As shown, the wire feeder 140 further includes a motor 219 (e.g., drive mechanism or similar) configured to turn one or more of the rollers 218, so as to feed (and/or retract) the wire electrode 250. In some examples, the welding system 100 may be a push/pull system, and the welding torch 118 may also include one or more rollers 218 and/or motors 219 configured to feed and/or retract the wire electrode 250. While, in the example of FIG. 2, the wire electrode 250 is depicted as being fed from the wire feeder 140 to the welding torch 118 in isolation, in some examples the wire electrode 250 may be routed through the welding cable 126 shown in FIG. 1 with other components of the welding system 100 (e.g., gas, power, etc.). In some examples, the welding torch 118 includes a separate wire feeder unit 120 configured to advance and/or retract the wire electrode 250 independently of or in concert with wire feeder 140. Thus, reference to a wire feeder and/or wire feed system (and/or associated motors, drive rolls and/or drive mechanisms) may include one or both of the wire feeder 140 and wire feeder unit 120. In some examples, a buffer 121 may be included to allow for retraction of the wire electrode 250 (e.g., via wire feeder unit 120) at the welding torch 118 without conflicting with a force on the wire electrode 250 from the wire feeder unit 140.

In the example of FIGS. 1 and 2, the welding power supply 108 also includes (and/or is coupled to) a gas supply 142. In the example of FIG. 2, the gas supply 142 is connected to the welding torch 118 through line 212. In some examples, the gas supply 142 supplies a shielding gas and/or shielding gas mixtures to the welding torch 118 (e.g., via line 212). A shielding gas, as used herein, may refer to any gas (e.g., $CO_2$, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). While depicted as its own line 212 in the example of FIG. 2, in some examples the line 212 may be incorporated into the welding cable 126 shown in FIG. 1.

In the example of FIGS. 1 and 2, the welding power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding power supply 108. In some examples, the operator interface 144 may comprise a remote control and/or pendant. In some examples, the operator 116 may use the operator interface 144 to enter and/or select one or more weld parameters (e.g., voltage, current, gas type, wire feed speed, workpiece material type, filler type, etc.) and/or weld operations for the welding power supply 108. In some examples, the weld parameters and/or weld operations may be stored in a memory 224 of the welding power supply 108 and/or in some external memory. The welding power supply 108 may then control (e.g., via control circuitry 134) its operation according to the weld parameters and/or weld operations.

In some examples (e.g., where the operator is a robot and/or automated welding machine), the operator interface 144 may be used to start and/or stop a welding process (e.g., stored in memory 224 and executed via control circuitry 134). In some examples, the operator interface 144 may further include one or more receptacles configured for connection to (and/or reception of) one or more external memory devices (e.g., floppy disks, compact discs, digital video disc, flash drive, etc.). In the example of FIG. 2, the operator interface 144 is communicatively coupled to control circuitry 134 of the welding power supply 108, and may communicate with the control circuitry 134 via this coupling.

In the example of FIGS. 1 and 2, the welding power supply 108 is configured to receive input power (e.g., from AC mains power, an engine/generator, a solar generator, batteries, fuel cells, etc.), and convert the input power to DC (and/or AC) output power (e.g., welding output power). In the example of FIG. 2, the input power is indicated by arrow 202. In the example of FIG. 1, the output power may be provided to the welding torch 118 via welding cable 126. In the example of FIG. 2, the output power may be provided to the welding torch 118 via line 208. While depicted as its own line 208 in the example of FIG. 2 for ease of explanation, in some examples the line 208 may be part the welding cable 126 shown in FIG. 1. In the example of FIGS. 1 and 2, the output power may be provided to the clamp 117 (and/or workpiece(s) 110) via clamp cable 115.

In the example of FIGS. 1 and 2, the welding power supply 108 includes power conversion circuitry 132 configured to convert the input power to output power (e.g., welding output power and/or other power). In some examples, the power conversion circuitry 132 may include circuit elements (e.g., transformers, rectifiers, capacitors, inductors, diodes, transistors, switches, and so forth) capable of converting the input power to output power. In the example of FIG. 2, the power conversion circuitry 132 includes one or more controllable circuit elements 204. In some examples, the controllable circuit elements 204 may comprise circuitry configured to change states (e.g., fire, turn on/off, close/open, etc.) based on one or more control signals. In some examples, the state(s) of the controllable circuit elements 204 may impact the operation of the power conversion circuitry 132, and/or impact characteristics (e.g., current/voltage magnitude, frequency, waveform, etc.) of the output power provided by the power conversion circuitry 132. In some examples, the controllable circuit elements 204 may comprise, for example, switches, relays, transistors, etc. In examples where the controllable circuit elements 204 comprise transistors, the transistors may comprise any suitable transistors, such as, for example MOSFETs, JFETs, IGBTs, BJTs, etc.

In some examples, the controllable circuit elements 204 of the power conversion circuitry 132 may be controlled by (and/or receive control signals from) control circuitry 134 of the welding power supply 108. In the examples of FIG. 2, the welding power supply 108 includes control circuitry 134 electrically coupled to the power conversion circuitry 132. In some examples, the control circuitry 134 operates to control the power conversion circuitry 132, so as to ensure the power conversion circuitry 132 generates the appropriate welding power for carrying out the desired welding operation.

In the example of FIG. 2, the control circuitry 134 includes a weld controller 220 and a converter controller 222. As shown the weld controller 220 and converter controller 222 are electrically connected. In some examples, the converter controller 222 controls the power conversion circuitry 132 (e.g., via the controllable circuit elements 204), while the weld controller 220 controls the converter controller 222 (e.g., via one or more control signals). In some examples, the weld controller 220 may control the converter controller 222 based on weld parameters and/or weld operations input by the operator (e.g., via the operator interface 144) and/or input programmatically. For example, an operator may input one or more target weld operations and/or weld parameters through the operator interface 144, and the weld controller 220 may control the converter controller 222 based on the target weld operations and/or weld parameters. The converter controller 222 may in turn control the power conversion circuitry 132 (e.g., via the controllable circuit elements 204) to produce output power in line with the weld operations and/or weld parameters. In some examples, the converter controller 222 may only send control signals to the power conversion circuitry 132 if an enable signal is provided by the weld controller 220 (and/or if the enable signal is set to true, on, high, 1, etc.).

In the example of FIG. 2, the weld controller 220 includes memory 224 and one or more processors 226. In some examples, the one or more processors 226 may use data stored in the memory 224 to execute certain control algorithms. The data stored in the memory 224 may be received via the operator interface 144, one or more input/output ports, a network connection, and/or be preloaded prior to assembly of the control circuitry 134. In the example of FIG. 2, the memory 224 further comprises a weld program 300, further discussed below. In some examples, the weld program 300 may make use of the processors 226 and/or memory 224. Though not depicted, in some examples the converter controller 222 may also include memory and/or one or more processors.

In the example of FIG. 2, the control circuitry 134 is in electrical communication with one or more sensors 236 via line 210. While shown as a separate line for ease of explanation in the example of FIG. 2, in some examples, line 210 may be integrated into the weld cable 126 of FIG. 1. In some examples, the control circuitry 134 may use the one or more sensors 236 to monitor the current and/or voltage of the output power and/or welding arc 150. In some examples the one or more sensors 236 may be positioned on, within, along, and/or proximate to the wire feeder 140, weld cable 126, power supply 108, and/or torch 118. In some examples, the one or more sensors 236 may comprise, for example, current sensors, voltage sensors, impedance sensors, temperature sensors, acoustic sensors, trigger sensors, position sensors, angle sensors, and/or other appropriate sensors. In some examples, the control circuitry 134 may determine and/or control the power conversion circuitry 132 to produce an appropriate output power, arc length, and/or extension of wire electrode 250 based at least in part on feedback from the sensors 236.

In the example of FIG. 2, the control circuitry 134 is also in electrical communication with the wire feeder 140 and gas supply 142. In some examples, the control circuitry 134 may control the wire feeder 140 to output wire electrode 250 at a target speed and/or direction. For example, the control circuitry 134 may control the motor 219 of the wire feeder 140 to feed the wire electrode 250 to (and/or retract the wire electrode 250 from) the torch 118 at a target speed. In some examples, the control circuitry 134 may also control one or more motors and/or rollers of the wire feeder 120 within the welding torch 118 to feed and/or retract the wire electrode 250. In some examples, the welding power supply 108 may control the gas supply 142 to output a target type and/or amount gas. For example, the control circuitry 134 may control a valve in communication with the gas supply 142 to regulate the gas delivered to the welding torch 118.

In some examples, a welding process may be initiated when the operator 116 activates the trigger 119 of the welding torch 118 (and/or otherwise activates the welding torch 118). During the welding process, the welding power provided by the welding power supply 108 may be applied to the wire electrode 250 fed through the welding torch 118 in order to produce a welding arc 150 between the wire electrode 250 and the one or more workpieces 110. The arc 150 may complete a circuit formed through electrical coupling of both the welding torch 118 and workpiece 110 to the welding power supply 108. The heat of the arc 150 may melt portions of the wire electrode 250 and/or workpiece 110, thereby creating a molten weld pool. Movement of the welding torch 118 (e.g., by the operator) may move the weld pool, creating one or more welds 111.

In some examples, the welding process may be initiated automatically and executed via control circuitry 134 in accordance with instructions stored in memory 224, such as program 300.

When the welding process is finished, the operator 116 may release the trigger 119 (and/or otherwise deactivate the welding torch 118). In some examples, the control circuitry 134 (e.g., the weld controller 220) may detect that the welding process has finished. For example, the control circuitry 134 may detect a trigger release signal via sensor 236. As another example, the control circuitry 134 may receive a torch deactivation command via the operator interface 144 (e.g., where the torch 118 is maneuvered by a robot and/or automated welding machine). In some examples, the current being applied to the welding torch 118 is monitored, as a change in the amount of current may indicate the end of the weld.

Figure 4A:
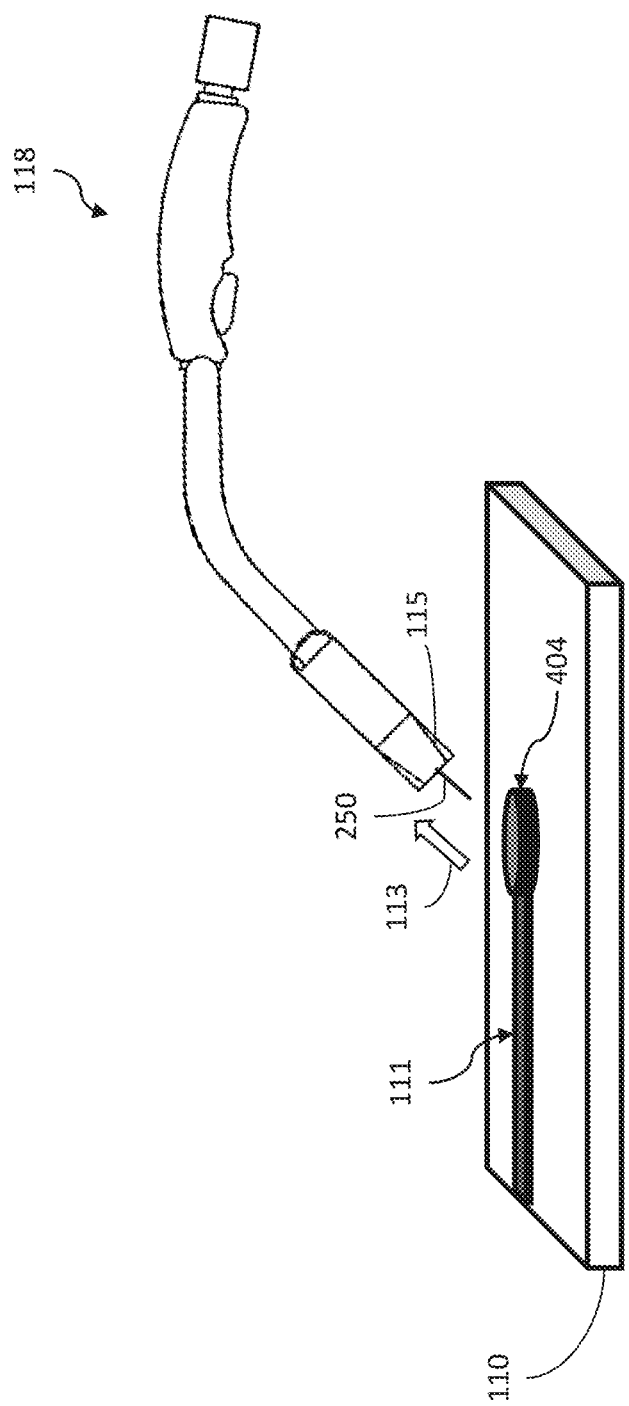
FIGS. 4a and 4b are perspective views illustrating an example welding process, in accordance with aspects of this disclosure.

In some examples, a weld may come to an end, such as a weld which is one or a plurality of welds being performed as part of a welding schedule. FIG. 4a shows an example depiction of the welding torch 118 and workpiece 110 at an end of the weld 111 as the welding process finishes. In the example of FIG. 4a, the weld 111 has been formed by the welding process, but the final portion of the weld 111 has yet to cool and is still a molten weld pool 404. Because the welding process has just finished, the welding torch 118 remains aimed at the weld pool 404.

In conventional welding systems, the control circuitry 134 might command the wire feeder 140 to stop feeding the wire electrode 250 after detecting that the welding process has finished. However, in the welding system 100 of the present disclosure, the control circuitry 134 activates the method or program 300 to control the wire electrode 250 to remain in or initiate motion at the end of a weld in response to detecting the welding process has finished, the weld has ended, and/or the end of the weld is imminent. In some examples, some or all of the program 300 may be implemented in machine readable instructions stored in memory 224 and/or executed by the one or more processors 226. In some examples, some or all of the program 300 may be implemented in analog and/or discrete circuitry. In some examples, the program 300 may be configured to retract the wire electrode 250 away from the molten weld pool 404 created by the welding process in order to mitigate the possibility of the wire electrode 250 fusing to a contact tip.

Figure 3:
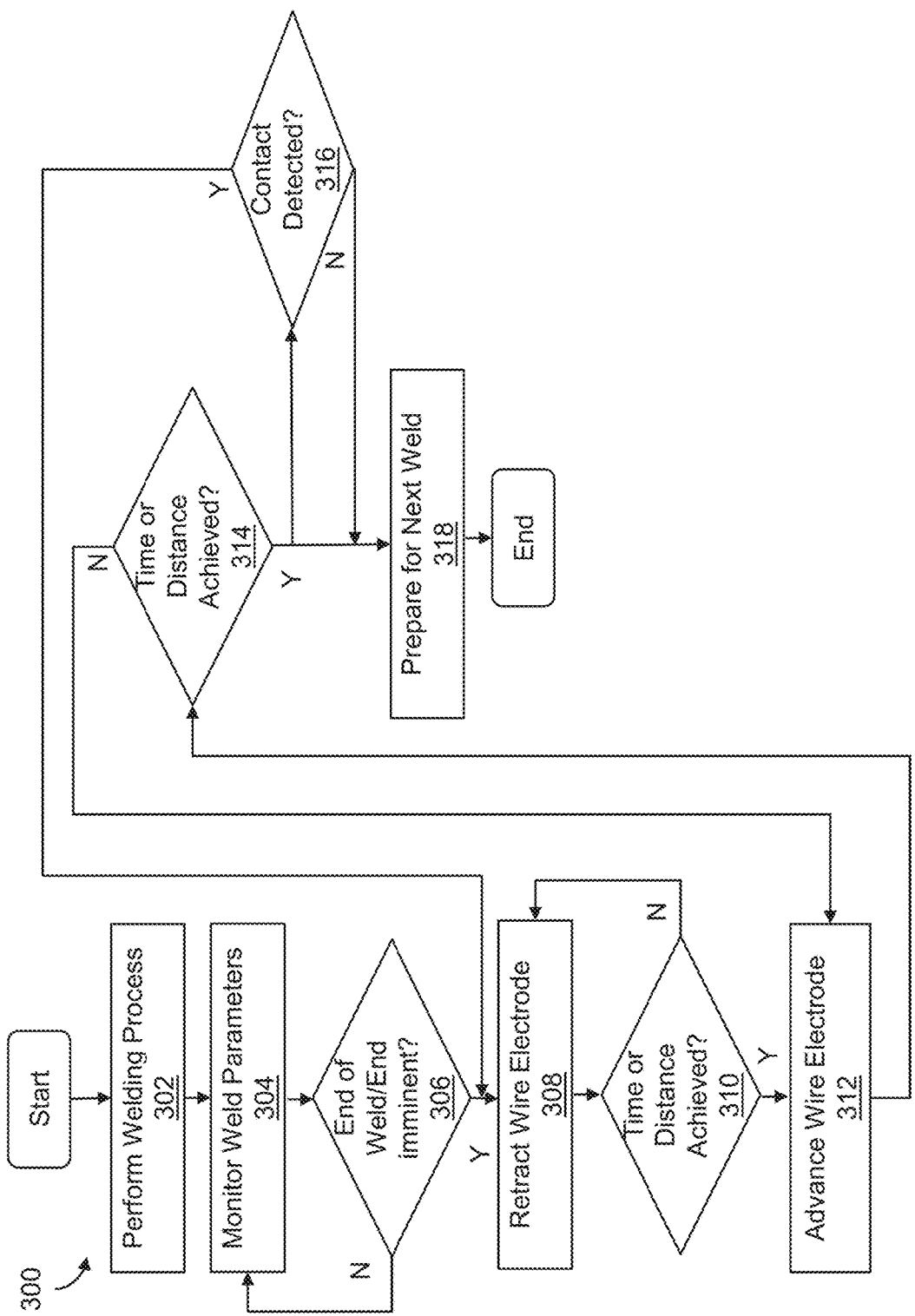
FIG. 3 is a flowchart illustrating an example welding program, in accordance with aspects of this disclosure.

FIG. 3 is a flowchart representative of the program 300. At block 302, the program 300 performs a welding operation in accordance with a stored welding program, user input, etc. At block 304, the program 300 monitors one or more welding parameters (e.g., of the power supply and/or welding program, etc.) and/or characteristics of the wire electrode, the workpiece, and/or the welding system. At block 306, the program 300 determines that the weld has ended (e.g., the welding process has finished), and/or that the end of the weld is imminent (based on the monitored parameters and/or characteristics).

In some examples, the program 300 may determine that the welding process has finished via detection by the control circuitry 134 (e.g., the weld controller 220). In some examples, the control circuitry 134 may detect that the welding process has finished by way of a trigger release signal from sensor 236. In some examples, the control circuitry 134 may detect that the welding process has finished via a signal sent through the connection (e.g., via weld cable 126) between the welding torch 118 and the welding power supply 108. For example, a signal (and/or change in voltage and/or current) may be detected by the control circuitry 134, such as when the trigger 119 is activated and/or deactivated. In some examples, activating the trigger 119 may open or close a trigger circuit (not shown) in the welding torch 118, while deactivating the trigger 119 may do the opposite. In some examples, the control circuitry 134 may detect that the welding process has finished via a signal detected from the operator interface 144. For example, in examples where the torch 118 is maneuvered by a robot and/or automated welding machine, a human may terminate a welding process via the operator interface 144, and the operator interface 144 may send a corresponding signal to the control circuitry 134. In some examples, the welding process may be programmatically controlled (e.g., via instructions stored in memory 224 and/or executed by processor(s) 226), and the termination of the welding process may be indicated to the control circuitry 134 (e.g., via an appropriate signal) by the program. In some examples, the control circuitry 134 may detect that the end of the weld via monitoring one or more welding parameters and/or outputs. For example, a change in the current provided to the welding torch 118 may indicate the end of the weld. While block 302 is shown as part of the program 300 in FIG. 3 for the sake of completeness, in some examples block 302 may be the trigger for executing program 300, rather than being part of program 300.

At block 308, the program 300 controls (e.g., via one or more signals) the wire feeder 140 (and/or torch 118) to continue movement of the wire electrode 250 by retracting the wire electrode 250 in direction 113 for a time $T_x$ and/or a distance $D_x$, as shown at block 310. In some examples, this retraction of the wire electrode 250 ensures that any hot spot on the wire electrode 250 is moved relative to the contact tip 115 to prevent or mitigate the opportunity for fusion. In some examples, the time $T_x$ and/or distance $D_x$ may be stored in memory 224 (e.g., as a welding process) and/or set by an operator (e.g., via the operator interface 144). In some examples, the program 300 may use the same wire feed speed employed in performing the weld, or a different wire feed speed may be used.

In the example of FIG. 3, after the expiration of time $T_x$ and/or retraction of the wire by distance $D_x$, the program 300 proceeds to block 312 to command (e.g., via one or more signals) the wire feeder(s) 120, 140 (and/or welding torch 118) to advance the wire electrode 250 forward for a time $T_y$, and/or a distance $D_y$, as shown at block 314. In some examples, the time $T_y$ and/or distance $D_y$ may be stored in memory 224 (e.g., as a welding process) and/or set by an operator (e.g., via the operator interface 144). In some examples, the time $T_y$ and/or distance $D_y$ may be the same as, greater than, or less than the time $T_x$ and/or distance $D_x$. In some examples, the program 300 may use the same wire feed speed employed at block 302, the wire feed speed set at block 308, and/or a different wire feed speed. In some examples, the wire feeder unit 120 may be employed to retract (and/or subsequently advance) the wire electrode 250 without the use of the wire feeder 140. The buffer 121 allows for a length of wire to push into a conduit or wire guide without damaging the wire electrode and/or the delivery mechanisms.

At block 316, the program 300 may optionally determine whether the wire electrode 250 has made contact with the contact tip or if contact has been avoided/removed. In some examples, the program 300 may determine there is contact if a short circuit is detected (e.g., if sensor 236 detects a current outside a predetermined range of current values and a voltage outside a predetermined range of voltage values). In some examples, the program 300 may determine that there is no contact if an open circuit is detected (e.g., if sensor 236 detects no or negligible current and a substantial voltage). In some examples, the program may determine whether there is contact through some other means (e.g., via a camera, thermal imaging device, spectrometer, spectrophotometer, etc.). As shown, if contact is still detected at block 316, the program 300 returns to block 308 to address the fusion by moving the electrode wire 250 (e.g., retract or advance the wire). In some examples, the program 300 may additionally or alternatively increase current to reduce the opportunity for fusion. If no contact is detected at block 316, the program 300 concludes that fusion has been successfully mitigated, and proceeds to block 318 in preparation for the next weld.

Figure 4B:
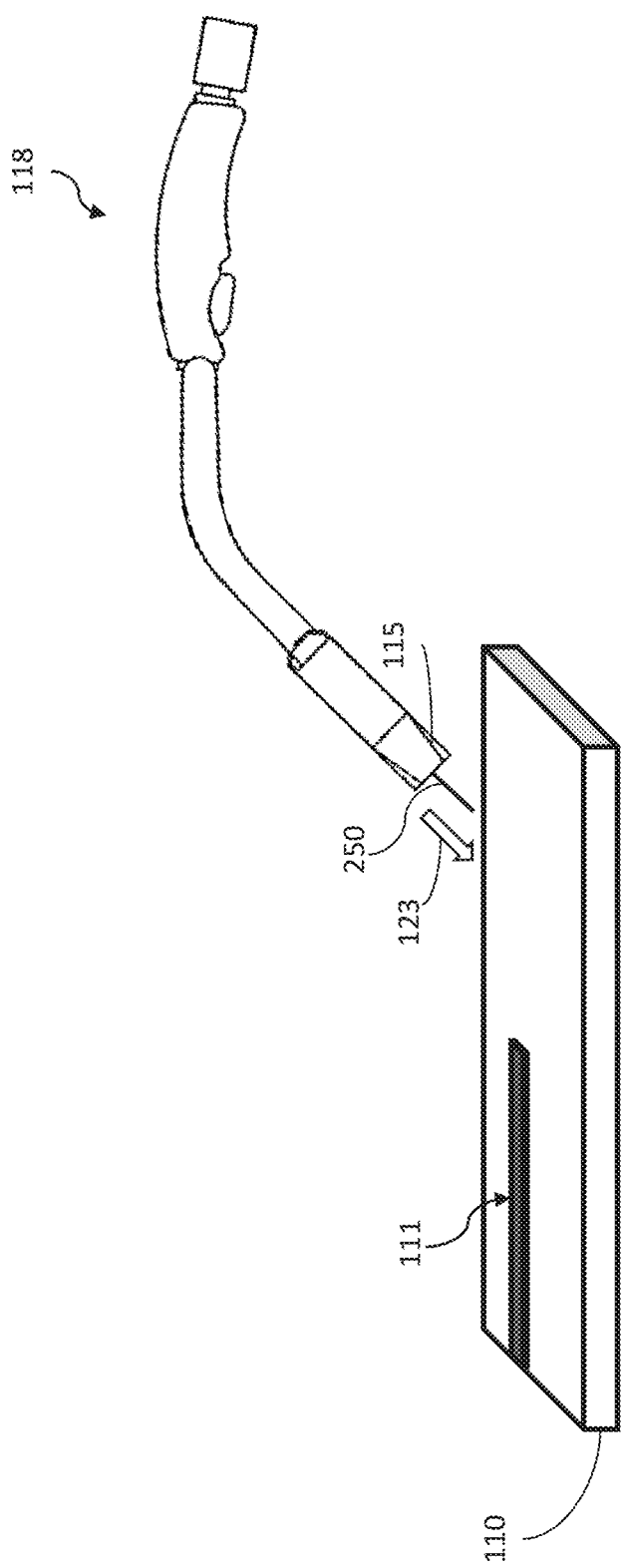

FIG. 4b shows an example depiction of the welding torch 118 and workpiece 110 after the wire electrode 250 has been fed forward toward the workpiece 110 in direction 123. As shown, the wire electrode 250 has advanced to a forward position in preparation for another weld. In the example of FIG. 4b, the wire electrode 250 has been fed forward to a position proximate the workpiece(s) 110, and, as a result, initiation of the next weld is implemented without the need to wait for the wire electrode 250 to advance (e.g., from a retracted position). In the example of multiple welds being performed in succession, the advancement of the wire electrode 250 prior to initiation of the next weld may save a significant amount of time and resources in the aggregate. Each weld may have similar characteristics (e.g., length, penetration, workpiece material, power characteristics, etc.) or may have varying characteristics. Regardless, presentment of the wire electrode in advance of initiating the weld provides clear advantages for a variety of welding programs.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A welding system, comprising:
   a wire feeder to advance and retract a welding wire;
   a welding power supply to provide power to a welding torch for establishing an electrical arc between the welding wire and a workpiece to perform a weld; and
   control circuitry configured to:
      determine an end of the weld and prior to initiation of another weld, wherein the determination of the end of the weld is based at least in part on data from a predetermined welding program;
      control the wire feeder to retract the welding wire for a first time or for a first distance in response to a determination the weld has ended; and
      control the wire feeder to advance the welding wire for a second time or for a second distance before initiation of another weld.

2. The system of claim 1, wherein the end of the weld corresponds to one of completion of the weld or a determination that the end of the weld is imminent.

3. The system of claim 1, wherein the welding program is defined by a welding process to perform a plurality of welds in succession.

4. The system of claim 1, wherein one or more of a length or a duration of the weld is predetermined in accordance with the predetermined welding program, the control circuitry further configured to determine the end of a weld based on the predetermined length or the predetermined duration.

5. The system of claim 1, wherein the predetermined welding program comprises a cyclic pattern of a plurality of similar or different welds.

6. The system of claim 1, wherein the input from a sensor corresponds to a current or a voltage of the power to the welding torch falling within a threshold range of values, or a change in the current or voltage falling within a threshold range of values.

7. The wire feeder of claim 1, wherein the control circuitry is further configured to control the welding power supply to provide power to the welding torch to initiate another weld after the second time or the second distance has been achieved.

8. The wire feeder of claim 1, wherein, upon determining that the end of the weld is imminent, the control circuitry is further configured to control the power supply to provide current to the welding torch as the welding wire retracts.

9. The wire feeder of claim 1, wherein, upon determining that the end of the weld is imminent, the control circuitry is further configured to control the power supply to end provision of power to the welding torch.

10. A wire feed system comprising:
    a drive mechanism configured to advance and retract a welding wire for establishing an electrical arc between the welding wire and a workpiece to perform a weld; and
    control circuitry configured to:
       receive a signal corresponding to a determination of an end of the weld, wherein a determination of the end of the weld is based at least in part on data from a predetermined welding program, and wherein the predetermined welding program is defined by a welding process to perform a plurality of welds in succession;
       control the drive mechanism to retract the welding wire for a first time or for a first distance; and
       control the drive mechanism to advance the welding wire for a second time or for a second distance prior to initiation of another weld.

11. The wire feed system of claim 10, wherein the first time is equivalent to the second time or the first distance is equivalent to the second distance.

12. The wire feed system of claim 10, wherein the first time is greater than the second time or the first distance is greater than the second distance.

13. The wire feed system of claim 10, wherein the welding wire is a cored wire.

14. The wire feed system of claim 13, wherein the cored wire comprises a metallic sheath enclosing a powdered metal.

15. The wire feed system of claim 10, wherein the welding wire is a solid wire.

16. The wire feed system of claim 10, wherein the control circuitry is further configured to initiate another weld after the second time.

17. The wire feed system of claim 10, wherein the wire feed system comprises a wire feeder configured to feed a welding wire to a welding torch.

18. The wire feed system of claim 10, wherein the wire feed system comprises a motorized torch with the drive mechanism incorporated within the torch.

* * * * *